(12) United States Patent
Liu

(10) Patent No.: US 10,785,088 B2
(45) Date of Patent: Sep. 22, 2020

(54) MANAGEMENT METHOD AND MANAGEMENT APPARATUS OF INTERNET OF THINGS AND INTERNET OF THINGS SYSTEM

(71) Applicant: BOE TECHNOLOGY GROUP CO., LTD., Beijing (CN)

(72) Inventor: Chenxu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 61 days.

(21) Appl. No.: 15/940,034

(22) Filed: Mar. 29, 2018

(65) Prior Publication Data

US 2019/0068433 A1 Feb. 28, 2019

(30) Foreign Application Priority Data

Aug. 30, 2017 (CN) .......................... 2017 1 0769890

(51) Int. Cl.
*H04L 12/24* (2006.01)
*H04L 29/08* (2006.01)
(Continued)

(52) U.S. Cl.
CPC ........ *H04L 41/046* (2013.01); *H04L 41/0893* (2013.01); *H04L 43/0876* (2013.01);
(Continued)

(58) Field of Classification Search
CPC ............... H04L 41/046; H04L 41/0893; H04L 43/0876; H04L 43/16; H04L 63/10; H04L 67/12; H04L 41/12; H04W 4/70
(Continued)

(56) References Cited

U.S. PATENT DOCUMENTS

2012/0278389 A1* 11/2012 Thangadorai ......... H04W 84/20
709/204
2013/0339504 A1* 12/2013 Montemurro ......... H04W 12/06
709/223
(Continued)

FOREIGN PATENT DOCUMENTS

| CN | 102142974 A | 8/2011 |
| CN | 103188648 A | 7/2013 |
| WO | WO-2015/031779 A1 | 3/2015 |

OTHER PUBLICATIONS

First Office Action for CN Appl. No. 20170769890.6, dated Feb. 6, 2020.

*Primary Examiner* — Backhean Tiv
*Assistant Examiner* — Schquita D Goodwin
(74) *Attorney, Agent, or Firm* — Dinsmore & Shohl LLP

(57) ABSTRACT

Some embodiments of the present disclosure disclose a management method and a management apparatus of Internet of things and an Internet of Things system. Disclosed is a method for managing Internet of Things, wherein the Internet of Things comprises a management apparatus, controlling terminals and data acquisition terminals for acquiring data resources, the method comprising switching, by the management apparatus, between a S01 mode in which the management apparatus connects and directly manages the controlling terminals and the data acquisition terminals; and a S02 mode in which the management apparatus connects and directly manages the controlling terminals, and authorizes at least one of the controlling terminals such that the at least one of the controlling terminals connects and directly manages at least one of the data acquisition terminals.

20 Claims, 6 Drawing Sheets

(51) Int. Cl.
  *H04L 12/26* (2006.01)
  *H04L 29/06* (2006.01)
  *H04W 4/70* (2018.01)

(52) U.S. Cl.
  CPC .............. *H04L 43/16* (2013.01); *H04L 63/10* (2013.01); *H04L 67/12* (2013.01); *H04W 4/70* (2018.02); *H04L 41/12* (2013.01)

(58) Field of Classification Search
  USPC ........................................................ 709/223
  See application file for complete search history.

(56) References Cited

U.S. PATENT DOCUMENTS

| | | | |
|---|---|---|---|
| 2014/0241354 A1* | 8/2014 | Shuman | H04L 67/16 370/390 |
| 2015/0163300 A1* | 6/2015 | Kumar | H04L 67/1046 709/205 |
| 2016/0352445 A1* | 12/2016 | Wu | H04W 4/70 |
| 2017/0149656 A1* | 5/2017 | Kumar | H04L 67/12 |
| 2018/0293355 A1* | 10/2018 | Allison | G16H 50/20 |
| 2019/0014172 A1* | 1/2019 | Chaki | H04W 8/186 |
| 2019/0050306 A1* | 2/2019 | Bhakri | H04L 67/1097 |
| 2019/0058711 A1* | 2/2019 | Zhu | H04W 4/70 |
| 2019/0116470 A1* | 4/2019 | Balasubramanian | H04W 72/005 |

* cited by examiner

Switching, by a management apparatus, an operation mode of IoT between the following two modes: S01 mode in which the management apparatus connects and manages directly controlling terminals and data acquisition terminals; S02 mode in which the management apparatus connects and manages directly the controlling terminals and authorizes at least one of the control terminals such that the at least one of the controlling terminals connects and directly manages at least one of the data acquisition terminal.

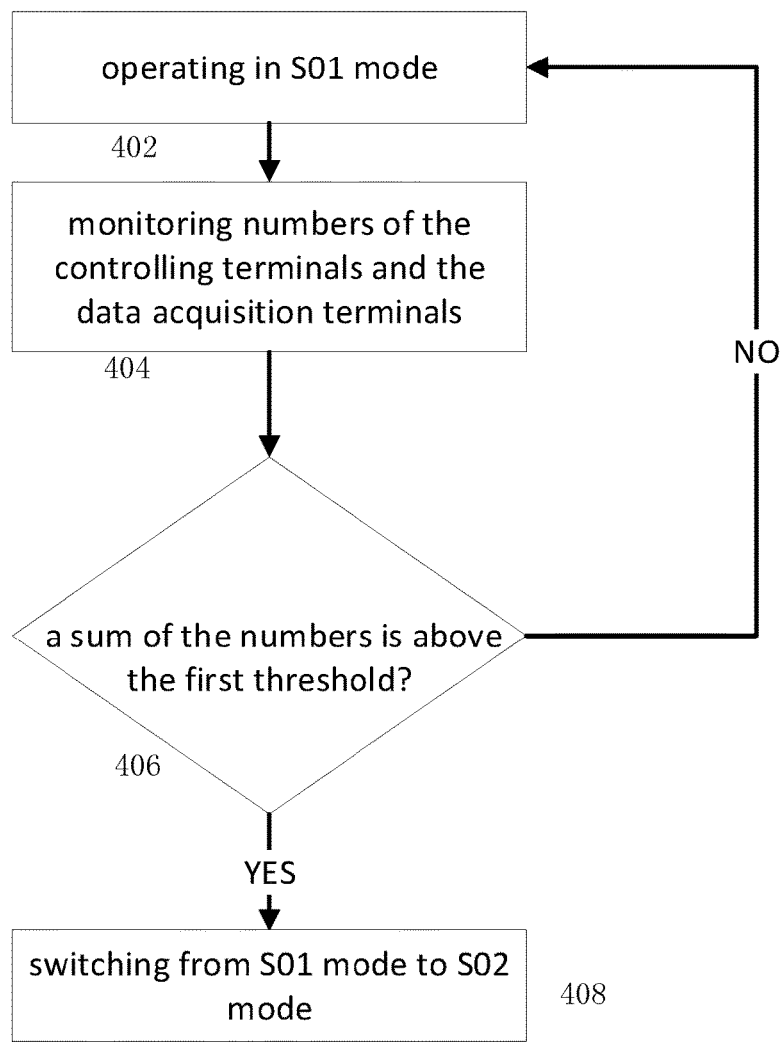

FIG. 4

MANAGEMENT METHOD AND MANAGEMENT APPARATUS OF INTERNET OF THINGS AND INTERNET OF THINGS SYSTEM

CROSS-REFERENCE TO RELATED APPLICATIONS

The present application claims priority to China Patent Application No. 201710769890.6 filed on Aug. 30, 2017, the disclosure of which is incorporated herein by reference in its entirety.

TECHNICAL FIELD

The present disclosure relates to a management method and a management apparatus of Internet of things and an Internet of Things system.

BACKGROUND

An Internet of Things (IoT) system includes an IoT platform and IoT terminals. The IoT system needs the IoT platform for unified management of the IoT terminals. The IoT terminals are responsible for data acquisition, reporting, transmission and control functions, etc., and transmitting data to the IoT platform. The IoT platform is responsible for collecting data acquired by the IoT terminal, analyzing, processing data and then feeding data back to a corresponding IoT terminal and providing support for services by the IoT terminal.

SUMMARY

According to some embodiments of the present disclosure, there is provided a method for managing Internet of Things, wherein the Internet of Things comprises a management apparatus, controlling terminals and data acquisition terminals for acquiring data resources, the method comprising switching, by the management apparatus, between a S01 mode in which the management apparatus connects and directly manages the controlling terminals and the data acquisition terminals; and a S02 mode in which the management apparatus connects and directly manages the controlling terminals, and authorizes at least one of the controlling terminals such that the at least one of the controlling terminals connects and directly manages at least one of the data acquisition terminals.

According to some other embodiments of the present disclosure, there is provided a management apparatus for Internet of Things, comprising: a memory storing computer-readable instructions thereon; and one or more processors coupled with the memory, configured to execute the computer-readable instructions to perform operations comprising: switching an operation mode of the Internet of Things between a S01 mode in which the management apparatus connects and directly manages controlling terminals and data acquisition terminals for acquiring data resources in the Internet of Things; and a S02 mode in which the management apparatus connects and directly manages the controlling terminals and authorizes at least one of the controlling terminals such that the at least one of the controlling terminals connects and directly manages at least one of the data acquisition terminals.

According to yet other embodiments of the present disclosure, there is provided an Internet of Things system including data acquisition terminals and controlling terminals configured to acquire data resources and the management apparatus as described above.

BRIEF DESCRIPTION OF THE DRAWINGS

Drawings are used to provide further understanding of technical solutions of the present disclosure and constitute a part of the description. Drawings are used with embodiments of the present disclosure to explain the technical solutions of the present disclosure and do not impose any restriction to the technical solutions of the present disclosure.

FIG. 3 is a flow chart of a management method for IoT provided according to some embodiments of the present disclosure;

FIG. 4 is a flow chart of an illustrative method executed by the IoT system according to embodiments of the present disclosure;

DETAILED DESCRIPTION

In order to make the object, technical solution and advantages of the present disclosure clearer, embodiments of the present disclosure will be explained in detail below with reference to accompany drawings. It is to be noted that embodiments and features in embodiments in the present application may be combined arbitrarily without conflicts.

In the embodiments below, an Internet of Things (IoT) may be covered by the IoT concepts defined by various standardization organizations such as the IoT technology standards proposed by working groups such as IoT-GSI, SG20 of ITU and IEEE-SA IoT, IEEE P2413 of IEEE.

In the following embodiments, data resource refers to various data detected, recorded and stored by various sensors and embedded computer systems such as video and pictures generated by various cameras in traffic IoT and derived data generated therefrom; temperature, humidity, electricity and data generated by cameras in SmartHome IoT; and production related data generated by various embedded computer terminals in factory IoT. The Internet of things (IoT) is the network of physical objects embedded with electronics, software, sensors, actuators, and connectivity which enables these objects to connect and exchange data.

In the following embodiments, the management apparatus, the controlling terminal and the data acquiring terminal may be implemented by running relevant operation instructions based on various processor structure, e.g., based on central processor (CPU) such as single chip microcomputer (MCU), field programmable logic logic (FPGA), application specific integrated circuit (ASIC) and digital signal processor (DSP). It is to be understood that memory structure connected with the processor and for storing functional codes for loading by the processor is also provided, such as ROM, Flash, HDD and SDD.

In the following embodiments, the mentioned connection, access etc. may be implemented by wired connection such as LAN, CAN, RS485, or by wireless connection such as WAN, Zigbee, WWAN.

In the following embodiments, the mentioned negotiation, authorization etc. may be processes of information interaction based on communication protocols, key algorithm etc. acceptable by both parties of the information instruction transmission and reception between the data acquiring terminal and the controlling terminal, between the controlling terminal and the management apparatus, and between the data acquiring terminal and the management apparatus.

Figure 1:
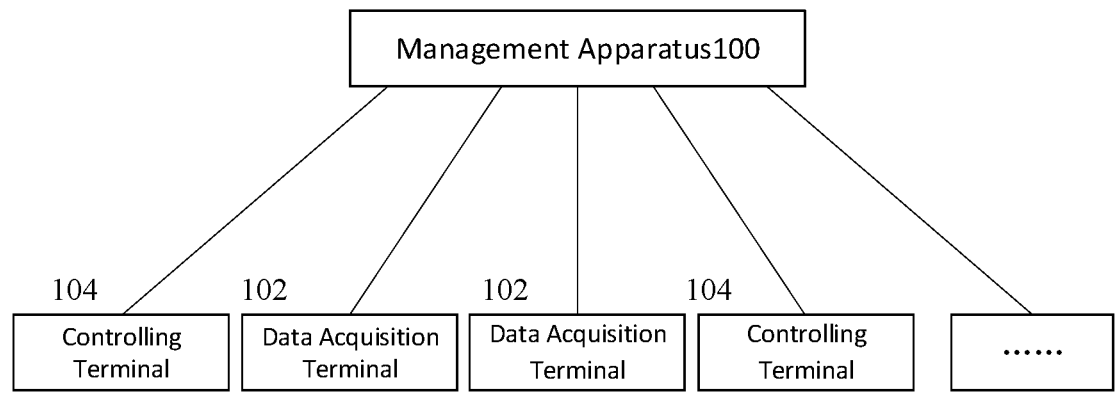
FIG. 1 is a structure diagram of an IoT system in an operation mode according to embodiments of the present disclosure.

FIG. 1 is a structure diagram of an IoT system in an operation mode (namely S01 mode) according to embodiments of the present disclosure. As shown in FIG. 1, a management apparatus 100 in the IoT platform in the IoT system controls all IoT terminals including data acquiring terminals 102 and controlling terminals 104. That is, the management apparatus 100 connects with and directly manages all the IoT terminals 102 and 104.

In S01 mode, with a gradual increase of the number of IoT terminals 102 and 104, e.g., up to a certain number, unified management by the management apparatus 100 for the IoT terminals 102 and 104 may increase loading of the IoT platform, and may also increase processing of the overall system, thereby reducing system's reliability and being impossible for efficient management of IoT terminals.

It is to be understood that the data acquiring terminal is responsible for data acquisition and reporting, and transmitting data to the management apparatus in the IoT platform with management authorization. The controlling terminal is not only responsible for data acquiring and reporting to the management apparatus in the IoT platform but also has the capability of controlling certain apparatus. The management apparatus is configured to control and manage the data acquisition terminals and the controlling terminals, transmit controlling instructions to the data acquisition terminals and the controlling terminals, manage behaviors of the data acquisition terminals and the controlling terminals, receive data and instructions reported by the data acquisition terminals and the controlling terminals, and process the data and instructions.

For example, the management apparatus is a server capable of management and data utilization for terminals in the IoT platform, and the S01 mode is a mode in which the management apparatus manages and controls directly the controlling terminals and the data acquisition terminals.

Figure 2:
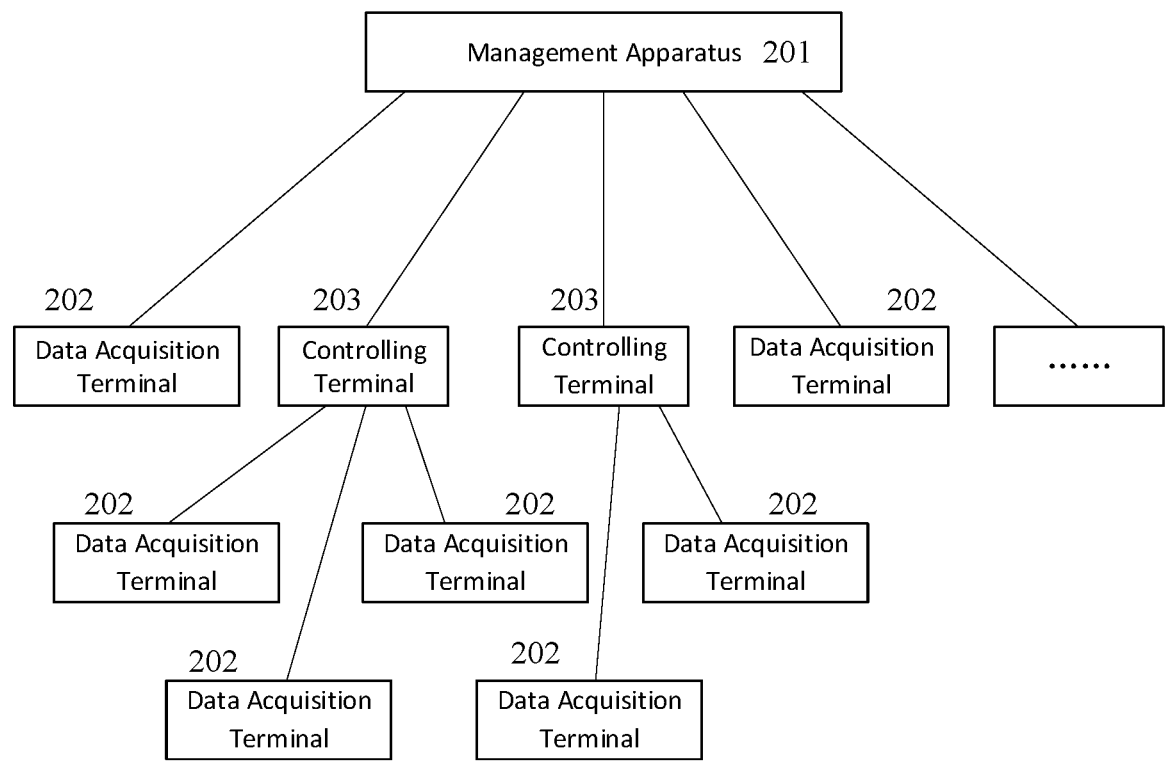
FIG. 2 is a structure diagram of an IoT system in another operation mode according to embodiments of the present disclosure.

FIG. 2 is a structure diagram of an IoT system in another operation mode (namely S02 mode) according to embodiments of the present disclosure. As shown in FIG. 2, the management apparatus 201 in the IoT platform in the IoT system connects and directly manages the controlling terminal 203. The controlling terminal 203 connects and directly manages one or more of the data acquisition terminals 202. In some embodiments, the management apparatus 201 may also connect and manage directly one or more of the data acquisition terminals 202.

FIG. 3 is a flow chart of a management method for IoT provided according to some embodiments of the present disclosure. As shown in FIG. 3, the method includes a step 300 of switching, by a management apparatus, an operation mode of the IoT between the following two modes: S01 mode (as shown in FIG. 1) in which the management apparatus connects and directly manages controlling terminals and data acquisition terminals; and S02 mode (as shown in FIG. 2) in which the management apparatus connects and directly manages controlling terminals and authorizes at least one of the control terminals such that the at least one of the controlling terminals connects and directly manages at least one of the data acquisition terminal.

According to embodiments of the present disclosure, in S02 mode, the management apparatus manages the controlling terminals, and the at least one of the controlling terminals manages the at least one of the data acquisition terminals, which reduces load of the management apparatus, reduces a flow of distribution of the IoT platform and decreases a control delay.

According to terminal load in the IoT, the management apparatus may switch between S01 mode and S02 mode, or dynamically switch one or more of the controlling terminals and/or one or more of the data acquisition terminals to operate in S01 or S02 mode, which can enhance efficiency and reliability of data acquisition by the IoT.

In some embodiments, the management apparatus operates in S01 mode in which the management apparatus may monitor numbers of the controlling terminals and the data acquisition terminals and in case that the sum of the numbers of the controlling terminals and the data acquisition terminals is greater than a first threshold, the management apparatus switches S01 mode to S02 mode such that the management apparatus authorizes at least one of the controlling terminals to enable the authorized controlling terminals to manage one or more of the data acquisition terminals.

In some embodiments, the management apparatus operates in S02 mode in which the management apparatus may monitor numbers of the controlling terminals and the data acquisition terminals and in case that the sum of the numbers of the controlling terminals and the data acquisition terminals is lower than a first threshold, the management apparatus switches S02 mode to S01 mode such that the management apparatus manages the controlling terminals and the data acquisition terminals directly.

For example, in some embodiments, it is assumed that $M_1$ controlling terminals, $N_1$ data acquisition terminals are accessing under the initial state ($M_1+N_1$ is not above a first threshold $N_{th}$). With an increasing scale of the IoT, when the number of the controlling terminals is increased to $M_2$, and the number of the data acquisition terminals is increased to $N_2$ ($M_2+N_2$ is above the first threshold $N_{th}$), the management apparatus switches at least the operation mode of one or more of the controlling terminals and one or more of the data acquisition terminals to S02 mode in which the one or more of the controlling terminals connect the one or more of data acquisition terminals and are authorized to manage directly the one or more of data acquisition terminals, in other words, the one or more of data acquisition terminals may accept direct management by the authorized one or more controlling terminals.

Optionally, in S02 mode, it is also possible to group the data acquisition terminals. For example, the management apparatus may monitor data utilization ratios of the controlling terminals with respect to the data acquisition terminals.

In case that a data utilization ratio of a controlling terminal with respect to a data acquisition terminal is above a second threshold, it is possible to group the controlling terminal and the data acquisition terminal as a group and the data acquisition terminal is used as the data acquisition terminal the controlling terminal connects and controls. It is appreciated that the management apparatus obtains and records data acquired by each data acquisition terminal and distributes a part of the obtained data to the controlling terminals and records data obtained by each controlling terminal that is provided by the data acquisition terminal, wherein a data utilization ratio of a controlling terminal with respect to a data acquisition terminal may refers to a ratio of data obtained by the controlling terminal that is provided by the data acquisition terminal over all data obtained by the controlling terminal.

Optionally, the first threshold and the second threshold may be adjusted and selected according to data amount of a corresponding IoT. For example, the first threshold and the second threshold may be set by the management apparatus.

Optionally, each controlling terminal may correspond to a plurality of data acquisition terminals and each data acquisition terminal may also correspond to a plurality of controlling terminals.

FIG. 4 illustrates a flow chart of an illustrative method executed by the IoT system according to embodiments of the present disclosure. As shown in FIG. 4, a method 400 may for example include the following steps: step 402 of operating the IoT system in S01 mode; step 404 of monitoring numbers of the controlling terminals and the data acquisition terminals; step 406 of determining whether a sum of the numbers of the controlling terminals and the data acquisition terminals is above a first threshold, if no, the method returns to step 402 to continue operating in S01 mode, and if yes, proceeds to step 408, namely switching, e.g., by the management apparatus, the operation mode of the IoT from S01 mode to S02 mode in response to determining that the sum of the numbers of the controlling terminals and the data acquisition terminals is above the first threshold.

Figure 5:
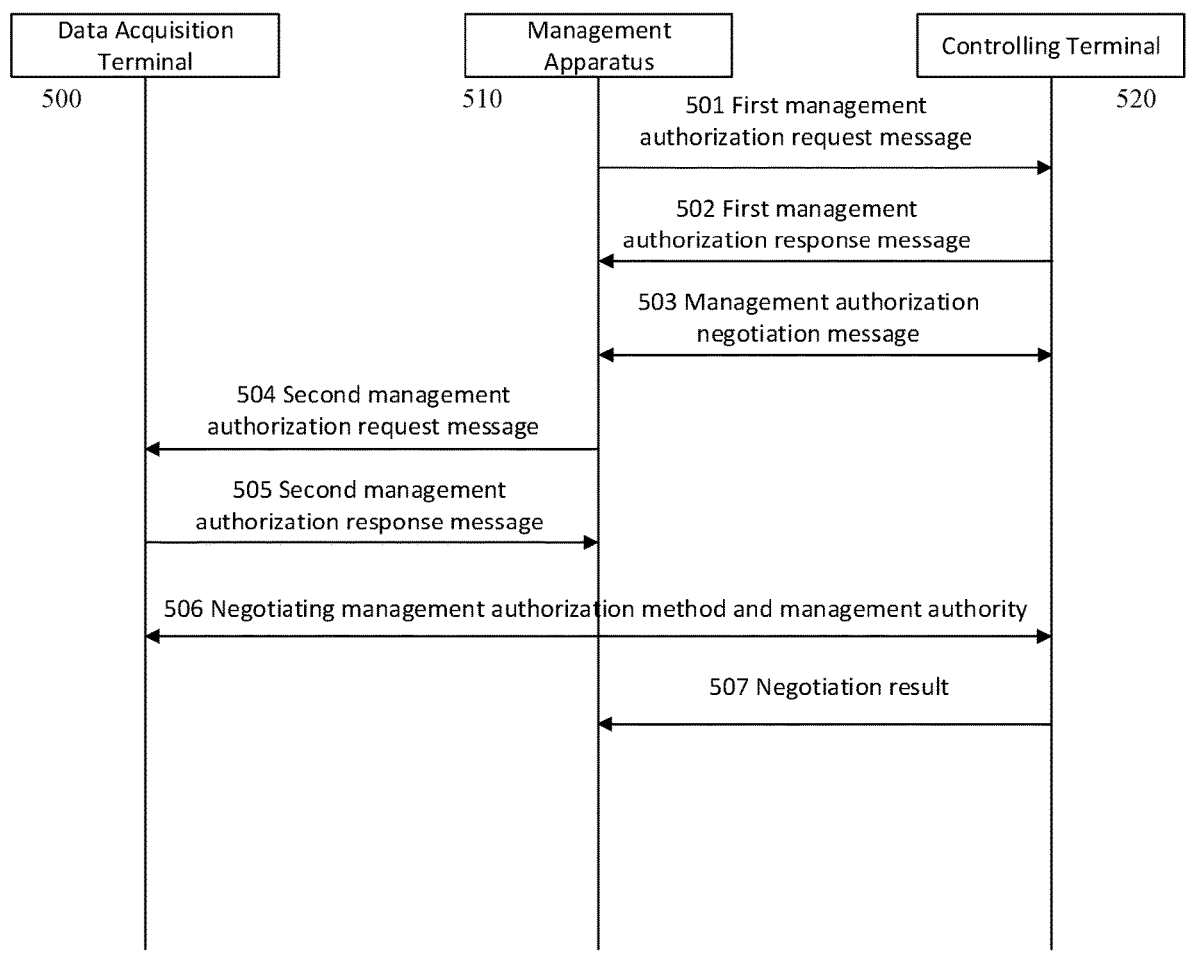
FIG. 5 is a interaction diagram of authorizing by a management apparatus in S02 mode provided according to some embodiments of the present disclosure.

As noted above, in S02 mode, the management apparatus authorizes the controlling terminals to manage the data acquisition terminals. FIG. 5 is an interaction diagram of authorization by a management apparatus in S02 mode provided according to some embodiments of the present disclosure. As shown in FIG. 5, a management apparatus 510 authorizes a controlling terminal 520 to manage a data acquisition terminal 500. For example, the following steps are included.

In step 501, the management apparatus 510 sends a first management authorization request message to the controlling terminal 520.

The first management authorization request message is used to inquire whether the controlling terminal 520 agrees to join in management of a data acquisition terminal.

In step 502, in case that the controlling terminal 520 agrees to join in management of a data acquisition terminal, the controlling terminal 520 feeds back a first management authorization response message to the management apparatus 510.

The first management authorization response message may include at least: an authorization acknowledgment message and key information of the controlling terminal 520.

In step 503, a number, ID information and management authority of corresponding data acquisition terminals 500 the controlling terminal 520 is authorized to manage are negotiated between the management terminal 510 and the controlling terminal 520.

Optionally, after the management apparatus 510 authorizes the controlling terminal 520 to manage the data acquisition terminal 500, the method further includes:

In step 504, the management apparatus 510 sends a second management authorization request message to the data acquisition terminal 500 corresponding to the controlling terminal 520.

The second management authorization request message may include at least: information for inquiring whether agree to accept management of the authorized controlling terminal 520, the ID information and the key information of the controlling terminal 520.

In step 505, in case that the data acquisition terminal 500 agrees to accept the management of the authorized controlling terminal 520, the data acquisition terminal 500 feeds back a second management authorization response message to the management apparatus 510.

The second management authorization response message may include at least: an authorization acknowledgment message. For example, the second management authorization response message is generated by the data acquisition terminal 500 according to the ID information of the controlling terminal 520.

In step 506, the controlling terminal 520 and the data acquisition terminal 500 negotiate. In case of a successful negotiation, the method proceeds to step 507, and the controlling terminal 520 connects and directly manages the data acquisition terminal 500. In case of a failed negotiation, the data acquisition terminal returns to S01 mode, that is, the data acquisition terminal 500 is managed directly by the management apparatus 510.

Optionally, step 506 includes for example that the data acquisition terminal negotiates with the controlling terminal 520 for the session key according to the ID information and the key information of the controlling terminal 520; and the data acquisition terminal and the controlling terminal 520 negotiate an authorization management method and management authority with the session key.

In step 507, the controlling terminal 520 feeds back a negotiation result to the management apparatus 510.

The negotiation result is obtained by negotiating an authorization management method and management authority between the data acquisition terminal and the controlling terminal 520.

Optionally, in S02 mode, when a new data acquisition terminal is accessing the IoT, the management apparatus selects a corresponding controlling terminal for it, which includes:

The management apparatus selecting the corresponding controlling terminal for the new data acquisition terminal according to ID information and location information of the new data acquisition terminal.

Figure 6:
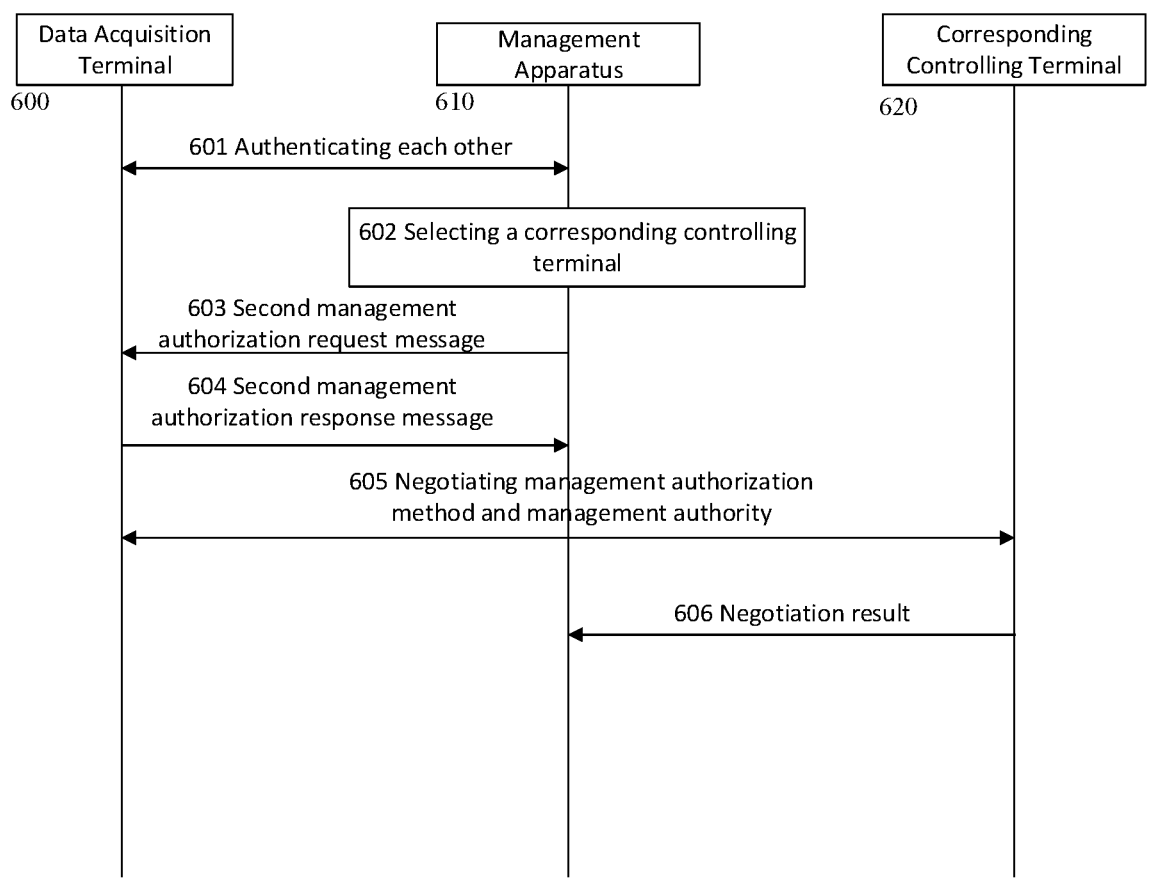
FIG. 6 is a diagram of interactions between a new data acquiring terminal, a management apparatus and a corresponding control terminal provided according to some embodiments of the present disclosure.

FIG. 6 is a diagram of interactions between a new data acquiring terminal 600, a management apparatus 610 and a corresponding controlling terminal 620 provided according to some embodiments of the present disclosure. As shown in FIG. 6, for the new data acquisition terminal 600, the management method for IoT further includes the following steps.

In step 601, the new data acquisition terminal 600 and the management apparatus authenticate each other.

Figure 7:
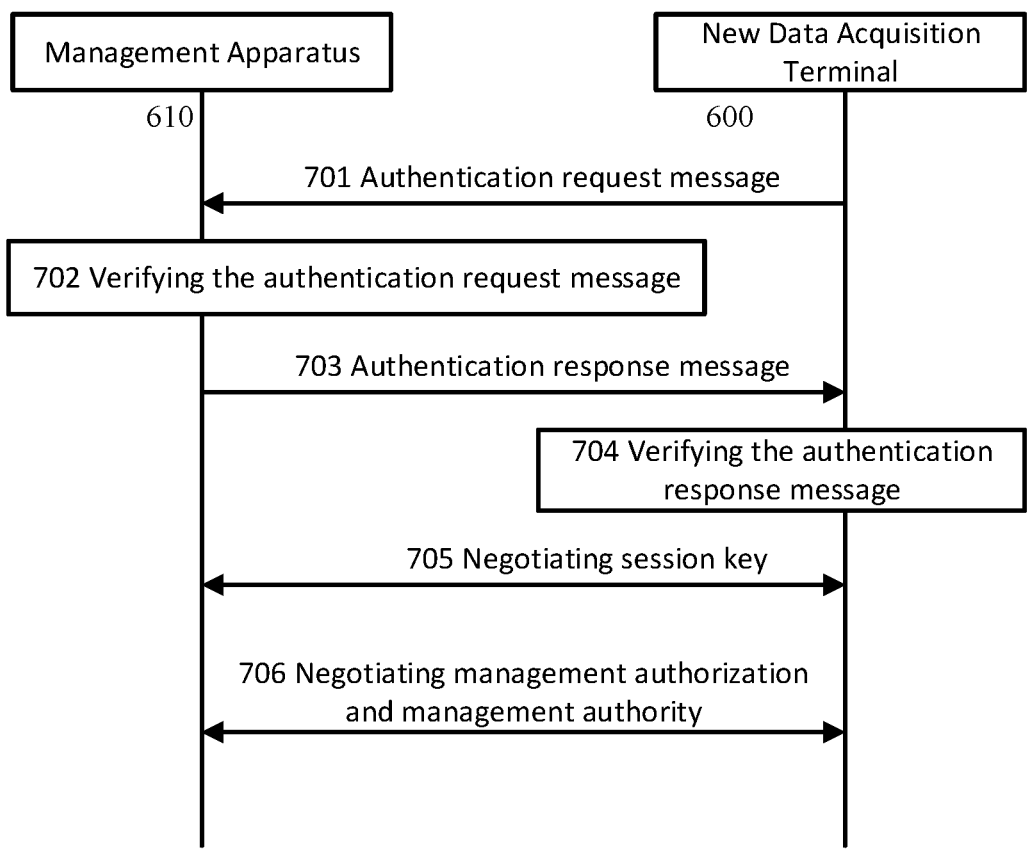
FIG. 7 is a diagram of authentication between a new data acquiring terminal and a management apparatus provided according to some embodiments of the present disclosure.

For example, FIG. 7 is an interaction diagram of authentication between the new data acquisition terminal 600 and the management apparatus 610 provided in some embodiments of the present disclosure. As shown in FIG. 7, the authentication process for example includes: step 701 of sending, by the new data acquisition terminal 600, an authentication request message to the management apparatus 610; step 702 of receiving and verifying, by the management apparatus 610, the authentication request message from the new data acquisition terminal 600, in case of failed verification by the management apparatus 610, forgoing, by the management apparatus, the authentication request message and the terminal authentication failing; in case of successful verification by the management apparatus, calculating, by the management apparatus, a shared key and a message authentication code according to the authentication request message to form an authentication response message, and step 703 of sending back the authentication response message to the new data acquisition terminal 600; and step 704 of authenticating, by the new data acquisition terminal 600, the authentication response message, in case of successful authentication, the new data acquisition terminal and the management apparatus 610 authenticating successfully; and in case of failed authentication, forgoing, by the new data acquisition terminal, the authentication response message and the new data acquisition terminal and the management apparatus failing authentication.

In step 602, the management apparatus 610 selects a corresponding controlling terminal 620 for the new data acquisition terminal 600.

For example, step 602 may include: the management apparatus 610 of the IoT platform selecting a corresponding controlling terminal 620 for the new data acquisition terminal 600 according to the ID information and location information of the new data acquisition terminal 600.

In step 603, the management apparatus 610 sends a second management authorization request message to the data acquisition terminal 600.

The second management authorization request message includes at least: information for inquiring whether to authorize the controlling terminal to manage, the ID information and the key information of the controlling terminal.

In step 604, the management apparatus 610 receives a second management authorization response message sent by the data acquisition terminal 600.

The second management authorization response message includes at least: an authorization acknowledgment message.

In step 605, the controlling terminal 620 and the new data acquisition terminal 600 negotiate. In case of successful negotiation, the controlling terminal 620 connects and manages the data acquisition terminal 600, the method proceeding to step 206. In case of failed negotiation, the data acquisition terminal 600 returns to S01 mode, that is, the data acquisition terminal is managed directly by the management apparatus.

For example, step 605 may include that the new data acquisition terminal negotiates with the controlling terminal for the session key according to the ID information and the key information of the controlling terminal 520; and the new data acquisition terminal and the controlling terminal negotiate the authorization management method and management authority with the session key.

In step 606, the controlling terminal feeds back a negotiation result to the management apparatus.

The negotiation result is obtained by negotiating an authorization management method and management authority between the data acquisition terminal and the controlling terminal.

In this embodiment, in the process that the controlling terminal manages the data acquisition terminal, the management apparatus may cancel the management authorization between the data acquisition terminal and the controlling terminal at any time and the data acquisition terminal may also ask the management apparatus to cancel authorization of direct management by the controlling terminal based on reasons such as data security and privacy.

Optionally, the management method of IoT further includes: in S02 mode, the IoT platform sends a management authorization cancellation message to a data acquisition terminal and a corresponding controlling terminal to cancel management authorization between the data acquisition terminal and the corresponding controlling terminal.

For example, after the data acquisition terminal receives the management authorization cancellation message, the data acquisition terminal deletes the session key and the management authority of the controlling terminal and refuses to accept management by the controlling terminal; and after the controlling terminal receives the management authorization cancellation message, it deletes the session key, ID information and address of the data acquisition terminal and refuses to receive data information from the data acquisition terminal.

The technical solution of the present disclosure can switch the management manner of IoT dynamically according to the number of data acquisition terminals and controlling terminals, which results in high flexibility. And, when the numbers of data acquisition terminals and controlling terminals are relatively large, at least one of the data acquisition terminals is managed by the controlling terminal(s), which reduces load of the management apparatus and realizes efficient management of the controlling terminals and the data acquisition terminals with limited carry capability.

The operation process of an illustrative management method of IoT will be described below with examples.

The management apparatus is operating in S01 mode, the management apparatus monitors numbers of the controlling terminals and the data acquisition terminals, in case that the sum of the numbers of the controlling terminals and the data acquisition terminals is not above the first threshold, the management apparatus remains in S01 mode, and in case that the sum of the numbers of the controlling terminals and the data acquisition terminals is above the first threshold, it enters into S02 mode.

In S02 mode, for example, the management apparatus monitors data utilization ratios of the controlling terminals with respect to the data acquisition terminals. When a data utilization ratio of a controlling terminal with respect to a data acquisition terminal is above the second threshold, the controlling terminal and the data acquisition terminal are classified as a group.

The data acquisition terminal serves as data an acquisition terminal the controlling terminal connects and controls.

Next, the management apparatus sends a first management authorization request message to the controlling terminal.

In case that the controlling terminal agrees to join in management of a data acquisition terminal, the controlling terminal feeds back a first management authorization response message to the management apparatus.

A number, ID information and management authority of corresponding data acquisition terminals which are authorized to be managed by the controlling terminal are negotiated between the management terminal and the controlling terminal.

The management apparatus sends a second management authorization request message to a data acquisition terminal corresponding to the controlling terminal.

In case that the data acquisition terminal agrees to accept management by the authorized controlling terminal, the data acquisition terminal feeds back the second management authorization response message to the management apparatus.

The controlling terminal negotiates with the data acquisition terminal and feeds back a negotiation result to the management apparatus. In case of successful negotiation, the controlling terminal connects and manages the data acquisition terminal, S02 mode being entered. In case of failed negotiation, the data acquisition terminal returns to S01 mode.

Now, if a new controlling terminal is accessing the IoT, the management apparatus manages directly. And if the new data acquisition terminal is accessing the IoT, the method may include:

The new data acquisition terminal and the management apparatus authenticate each other.

The management apparatus selects a corresponding controlling terminal for the new data acquisition terminal.

The management apparatus sends a second management authorization request message to the new data acquisition terminal.

The management apparatus receives a second management authorization response message sent by the data acquisition terminal.

The controlling terminal negotiates with the new data acquisition terminal and feeds back a negotiation result to the management apparatus. If the controlling terminal and the new data acquisition terminal negotiate successfully, the controlling terminal manages the new data acquisition terminal.

Figure 8:
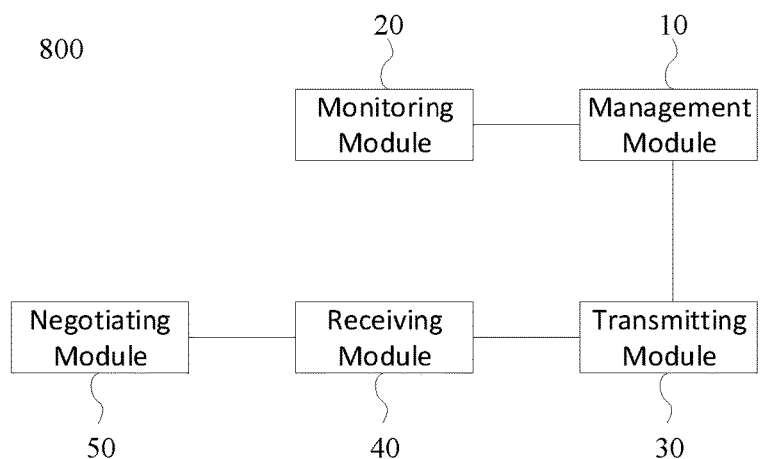
FIG. 8 is a structure diagram of a management apparatus provided according to some embodiments of the present disclosure.

FIG. 8 is an example structure diagram of a management apparatus according to embodiments of the present disclosure. In connection with FIGS. 1 and 2, as shown in FIGS. 6 and 7, it is understood that the IoT system provided in some embodiments of the present disclosure may include a management apparatus accessing the IoT, data acquisition terminals and controlling terminals. The data acquisition terminals and a controlling terminals are connected with the management apparatus.

The data acquisition terminal may include for example a data acquisition module configured to acquire data resource in the IoT.

The controlling terminal may include for example a data acquisition module configured to acquire data resource in the IoT and a controlling module configured to connect and manage at least one of data acquisition terminals under the authorization by the management apparatus.

As shown in FIG. 8, the management apparatus 800 may include a management module 10 configured to selectively switch on or off states of a controlling module of at least one of the controlling terminals.

The management apparatus 800 may be a management layer server, an application layer server or a cloud server in the IoT platform. It is to be understood that the data acquiring terminal is responsible for data acquisition and reporting, and transmitting data to the management apparatus in the IoT platform with management authorization. The controlling terminal is not only responsible for data acquiring and reporting to the IoT platform but also has the capability of controlling certain apparatus. The management apparatus in the IoT platform is configured to control and manage the data acquisition terminal and the controlling terminal, transmit controlling instructions to the data acquisition terminal and the controlling terminal, manage the behavior of the data acquisition terminal and the controlling terminal, receive data and instructions reported by the data acquisition terminal and the controlling terminal, and process the data and instructions. In addition, the IoT platform further has functions such as security, billing and network management.

Optionally, the management apparatus may further include a monitoring module 20 connected with the management module 10. The monitoring module 20 is configured to monitor numbers of the controlling terminals and the data acquisition terminals, output a first state indication to the management module 10 in case that the sum of the numbers of the controlling terminals and the data acquisition terminals is above a first threshold; and the management module 10 is configured to start the controlling module of the controlling terminal when receiving the first state indication.

Optionally, the monitoring module 20 is configured to monitor data utilization ratios of the data acquisition terminals. When a data utilization ratio of a controlling terminal with respect to a data acquisition terminal is above the second threshold, a second state indication is output to the management module 10; the management module is configured to receive the second state indication, and group the controlling terminal and the data acquisition terminal as a group and the data acquisition terminal is used as the data acquisition terminal the controlling terminal connects and controls.

Optionally, the monitoring module 20 is further configured to monitor the access request from the new data acquisition terminal and output a third state indication according to the ID information and the location information of the new data acquisition terminal, and the management module 10 is configured to receive the third state indication, and select a controlling terminal to connect and manage the new data acquisition terminal.

Optionally, the management apparatus 800 may further include a transmitting module 30, a receiving module 40 and a negotiation module 50.

The transmitting module 30 is configured to transmit a first management authorization request message to the controlling terminal and transmit a second management authorization request message to the data acquisition terminal.

The first management authorization request message is used to inquire whether the controlling terminal agree to join in management of a data acquisition terminal; and the second management authorization request message includes at least: information for inquiring whether agree to authorize management by the controlling terminal, ID information and key information of the controlling terminal.

The receiving module 40 is configured to receive a first management authorization response message transmitted by the controlling terminal and receive a second management authorization response message transmitted by the data acquisition terminal.

The first management authorization response message includes at least: an authorization acknowledgment message and key information of the controlling terminal, wherein the second management authorization response message includes at least an authorization acknowledgment message. The receiving module 40 is further configured to receive a negotiation result transmitted by the controlling terminal.

The negotiation module 50 is configured to negotiate with the controlling terminal a number, ID information and management authority of corresponding data acquisition terminals which are authorized to be managed by the controlling terminal.

In this embodiment, the IoT system is configured to carry out the management method of IoT provided according to some embodiments of the disclosure, which have similar implementation processes and implementation principles that will not be described any more herein.

The system of IoT provided in some embodiments of the present disclosure may include: a management apparatus accessing the IoT, data acquisition terminals and controlling terminals connected with the management apparatus; wherein the data acquisition terminal includes a data acquisition module configured to acquire data resources in IoT; wherein the controlling terminal includes a data acquisition module configured to acquire data resources in the IoT and a controlling module configured to connect and manage at least one of the data acquisition terminals under authorization of the management apparatus; wherein the management apparatus includes a management module configured to selectively switch on or off states of a controlling module of at least one of the controlling terminals. The technical solution of the present disclosure can dynamically switch a management manner of IoT according to numbers of the data acquisition terminals and the controlling terminals, and manage one or more of the data acquisition terminals with the controlling terminals when the numbers of the data acquisition terminals and the controlling terminals are relatively large, which reduces load of the management apparatus and realizes efficient management of controlling terminals and data acquisition terminals with limited carry capability.

In embodiments of the present disclosure, functional blocks such as the data acquisition module, the controlling module, the transmitting module, the receiving module, the negotiation module, the management module and the monitoring module may be implemented by logic operation circuits with data processing capability and/or program execution capability which may be designed to execute functions of certain modules or be designed as one or more processors that run computer instructions to execute functions of the one or more modules as described previously.

Here, the computer instructions include one or more processor operations defined by an instruction set architecture corresponding to the processors and may be contained and represented logically by one or more computer programs.

General Hardware Environment

Figure 9:
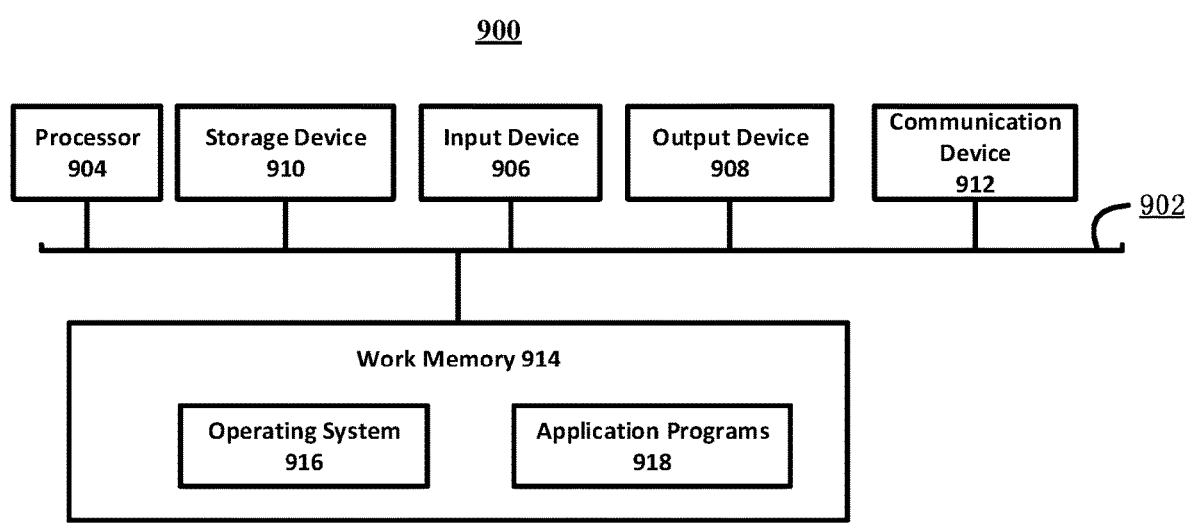
FIG. 9 is a block diagram illustrating a general hardware environment that may implement the apparatus according to embodiments of the present disclosure.

FIG. 9 is a block diagram illustrating a general hardware environment 900 that may implement the apparatus according to embodiments of the present disclosure.

With reference to FIG. 9, a computing device 900 as an example of a hardware device to which aspects of the present disclosure may be applied will be described now. The computing device 900 may be any machine configured to execute processing and/or computation, that may be, but not limited to a workstation, a server, a desktop computer, a laptop computer, a tablet computer, a personal digital assistant, a smart cell phone, an on-vehicle computer or any combination thereof. The aforementioned management apparatus 100 may be implemented by a computing device 900 or a similar device or system completely or at least in part.

The computing device 900 may include elements connected with or communicating with the bus 902 in which the connection or communication may be implemented via one or more interfaces. For example, the computing device 900 may include a bus 902, one or more processors 904, one or more input devices 906 and one or more output devices 908. The one or more processors 904 may be any kind of processors and may include, without limitation one or more general-purpose processors and/or one or more special purpose processors such as special purpose processing chips. The input device 906 may be any kind of devices that can input information to the computing device and may include, but not limited to a mouse, a keyboard, a touch screen, a microphone and/or a remote controller. The output device 908 may be any kind of devices that can present information and may include but not limited to a display, a speaker, a video/audio output terminal, a vibrator and/or a printer. The computing device 900 may further include or be connected with a non-transient storage device 910 that may be any non-transient storage device capable of storing data and may include, without limitation, a magnetic disk drive, an optical storage device, a solid state storage device, a floppy disk, a floppy magnetic disk, a hard drive, a magnetic tape or any other magnetic medium, optical disk or any other optical medium, ROM (read-only memory), RAM (random access memory), cache memory and/or any other memory chip or cassette and/or any other medium from which a computer can read data, instructions and/or codes. The non-transient storage device 910 may have data/instructions/codes for implementing the above-described method and steps. The computing device may further include a communication device 912. The communication device 912 may be any kind of devices that can communicate with external devices and/or networks and may include, without limitation a modem, a network adapter, an infrared communication device, a wireless communication device and/or a chip set, such as a Bluetooth™ device, an 802.11 device, a Wi-Fi device, a WiMax device and a cellular communication facility etc.

The computing device 900 may further include a work memory 914 that may be any types of work memories storing instructions and/or data for the processor's 904 operation and may include, without limitation a random access memory and/or a read-only memory device.

Software components may be located in the work memory 914, and include, but not limited to an operating system 916, one or more application programs 918, drivers and/or other data and codes. Instructions for carrying out the method and steps described above may be included in one or more application programs 918, and components/units/modules of the management apparatus, the data acquisition terminal and the controlling terminal may be implemented by the processor 904 reading and calling instructions from the one or more application programs 918. Executable codes or source codes for instructions of software elements may be stored in a non-transient computer readable storage medium such as the above-described (one or more) storage devices 910 and may be read into the work memory 914 and may be compiled and/or installed. Executable codes or source codes for instructions of software elements may also be downloaded remotely.

The bus 902 may include, but not limited to an industry standard architecture (ISA) bus, a micro-channel architecture (MCA) bus, an enhanced ISA (EISA) bus, a video electronic standard association (VESA) local bus and a periphery component interconnect (PCI) bus.

The computing device 900 may further include a work memory 914 that may be any kinds of work memories storing instructions and/or data useful for the processor's 904 operation and may include, without limitation a random access memory and/or a read-only memory device.

It is understood that various changes may be made according to specific demands. For example, it is also possible to use custom hardware and/or implement specific elements with hardware, software, firmware, middleware, microcodes, hardware descriptor language or any combination thereof. In addition, it is possible to use connections to other computing devices such as network input/output devices. For example, some or all of the disclosed method may be implemented by programming hardware such as programmable logic circuits including field programmable gate array (FPGA) and/or programmable logic array (PLA) with assembly languages or hardware programming languages such as VERILOG, VHDL, C++ according to the logic and algorithm of the present disclosure.

It is also understandable that the components of the computing device 900 may be distributed in the network. For example, some processing may be executed by one processor while other processing may be executed by another processor remote from the processor. Other components of the computing system 900 may be distributed similarly. In this way, the computing device 900 may be interpreted as a distributed computing system that executes processing at a plurality of locations.

For example, the management apparatus according to embodiments of the present disclosure may include a memory storing computer-readable instructions thereon; and one or more processors coupled with the memory, which are configured to carry out the management method according to embodiments of the present disclosure while executing the computer-readable instructions.

It is to be noted that the present disclosure further provides a non-transient computer-readable medium storing instructions thereon which cause the processor to carry out steps of each of the above mentioned methods while being executed by the processor.

It is possible to implement the method and apparatus of the present disclosure in many ways. For example, it is possible to implement the method and device of the present disclosure with software, hardware, firmware or any combination thereof. The order of the method steps as described above is only illustrative, and steps of the methods of the present disclosure are not limited to the above specifically described order unless otherwise noted specifically. Furthermore, in some embodiments, the present disclosure may also be implemented as a program recorded in a recording medium which includes machine-readable instructions for implementing methods according to the present disclosure. Accordingly, the present disclosure further covers the recording medium for implementing the programs for methods according to the present disclosure.

Although some specific embodiments of the present disclosure have been described with examples, one skilled in the art should understand that the above examples are only intended to be illustrative rather than limiting the scope of the present disclosure. Those skilled in the art should understand that the above-described embodiments may be modified without departing from the spirit and scope of the present disclosure. The scope of the present disclosure is defined by the accompanying claims.

Although the implementations of the present disclosure are disclosed as above, the described contents are only those adopted to facilitate understanding the present disclosure rather than limiting the present disclosure. Any one of skill in the field to which the present disclosure belongs may make any modifications and changes to the form and details of implementations without departing from the spirit and scope disclosed in the present disclosure. However, the scope of the present disclosure should still be subject to the scope as defined by the accompanying claims.

What is claimed is:

1. A method for managing a network of things, wherein the network of things comprises a management apparatus, controlling terminals and data acquisition terminals for acquiring data resources, the method comprising:
    switching, by the management apparatus, between:
        a S01 mode in which the management apparatus directly connects and directly manages the controlling terminals and the data acquisition terminals, and
        a S02 mode in which the management apparatus directly or indirectly connects the data acquisition terminals, directly connects and directly manages the controlling terminals, and authorizes at least one of the controlling terminals such that the at least one of the controlling terminals directly connects and directly manages at least one of the data acquisition terminals;
    wherein, the method further comprises in the S02 mode, grouping the data acquisition terminals, wherein grouping the data acquisition terminals comprises:
        monitoring, by the management apparatus, data utilization ratios of the controlling terminals with respect to the data acquisition terminals,
        in case that a data utilization ratio of a controlling terminal with respect to a data acquisition terminal is above a second threshold, classifying the controlling terminal and the data acquisition terminal as a group, so that the data acquisition terminal is used as a data acquisition terminal the controlling terminal directly connects and directly controls, wherein the data utilization ratio of the controlling terminal with respect to said data acquisition terminal refers to a ratio of data obtained by the controlling terminal that is provided by the data acquisition terminal over all data obtained by the controlling terminal, and
        using the data acquisition terminal as a data acquisition terminal directly connected to and directly managed by the controlling terminal to form the group,
        wherein in the S02 mode the management apparatus obtains and records data acquired by each data acquisition terminal of the network of things and distributes at least a part of the obtained data to at least one controlling terminal of the network of things and records data obtained by each of the at least one controlling terminal that is provided by each data acquisition terminal.

2. The method of claim 1, further comprising:
    monitoring, by the management apparatus, numbers of the controlling terminals and the data acquisition terminals; and
    in response to determining that a sum of the numbers of the controlling terminals and the data acquisition terminals is above a first threshold, switching, by the management apparatus, an operation mode of the network of things from the S01 mode to the S02 mode.

3. The method of claim 1, further comprising, in the S02 mode, in response to a new data acquisition terminal accessing the network of things, selecting, by the management apparatus, a corresponding controlling terminal for the new data acquisition terminal,
    wherein selecting, by the management apparatus the corresponding controlling terminal for the new data acquisition terminal comprises:
    selecting, by the management apparatus a corresponding controlling terminal for the new data acquisition terminal according to ID information and location information of the new data acquisition terminal.

4. The method of claim 1, further comprising:
in the S02 mode, sending, by the management apparatus, a management authorization cancellation message to a data acquisition terminal and a corresponding controlling terminal to cancel management authorization between the data acquisition terminal and the corresponding controlling terminal.

5. The method of claim 1, further comprising:
in the S02 mode, authorizing, by the management apparatus, a controlling terminal to manage a data acquisition terminal,
wherein authorizing, by the management apparatus, the controlling terminal to manage the data acquisition terminal comprises:
transmitting, by the management apparatus, a first management authorization request message to the controlling terminal, wherein the first management authorization request message is used to inquire whether the controlling terminal agrees to join in management of a data acquisition terminal;
in case that the controlling terminal agrees to join in the management of the data acquisition terminal, the controlling terminal feeds back a first management authorization response message to the management apparatus, wherein the first management authorization response message comprises at least: an authorization acknowledgment message and key information of the controlling terminal; and
negotiating, between the management apparatus and the controlling terminal, a number, ID information and management authority of data acquisition terminals the controlling terminal is authorized to manage.

6. The method of claim 5, further comprising:
in response to that the management apparatus has authorized the controlling terminal to manage the data acquisition terminal, transmitting, by the management apparatus, a second management authorization request message to the data acquisition terminal corresponding to the controlling terminal, wherein the second management authorization request message comprises at least: information for inquiring whether to agree to accept management by the authorized controlling terminal, the ID information and the key information of the controlling terminal;
in case that the data acquisition terminal agrees to accept management by the authorized controlling terminal, feeding back, by the data acquisition terminal, a second management authorization response message to the management apparatus, wherein the second management authorization response message comprises at least: an authorization acknowledgment message; and
negotiating, between the controlling terminal and the data acquisition terminal, a management authorization method and a management authority and feeding back a negotiation result to the management apparatus.

7. The method of claim 6, wherein the negotiating, between the controlling terminal and the data acquisition terminal, the management authorization method and the management authority comprises:
negotiating by the data acquisition terminal a session key with the controlling terminal according to the ID information and the key information of the controlling terminal;

negotiating the management authorization method and the management authority between the data acquisition terminal and the controlling terminal with the session key; and
in case of a successful negotiation, connecting and managing, by the controlling terminal, the data acquisition terminal.

8. The method of claim 7, wherein in case of a failed negotiation, the data acquisition terminal returns to the S01 mode.

9. A method for managing a network of things, wherein the network of things comprises a management apparatus, controlling terminals and data acquisition terminals for acquiring data resources, the method comprising:
switching, by the management apparatus, between:
a S01 mode in which the management apparatus directly connects and directly manages the controlling terminals and the data acquisition terminals, and
a S02 mode in which the management apparatus directly or indirectly connects the data acquisition terminals, directly connects and directly manages the controlling terminals, and authorizes at least one of the controlling terminals such that the at least one of the controlling terminals directly connects and directly manages at least one of the data acquisition terminals;
wherein, the method further comprises in the S02 mode, authorizing, by the management apparatus, a controlling terminal to manage a data acquisition terminal,
wherein authorizing, by the management apparatus, the controlling terminal to manage the data acquisition terminal comprises:
in case that a data utilization ratio of a controlling terminal with respect to a data acquisition terminal is above a second threshold, classifying the controlling terminal and the data acquisition terminal as a group, wherein the data utilization ratio of the controlling terminal with respect to said data acquisition terminal refers to a ratio of data obtained by the controlling terminal that is provided by the data acquisition terminal over all data obtained by the controlling terminal,
transmitting, by the management apparatus, a first management authorization request message to the controlling terminal, wherein the first management authorization request message is used to inquire whether the controlling terminal agrees to join in management of a data acquisition terminal;
in case that the controlling terminal agrees to join in the management of the data acquisition terminal, the controlling terminal feeds back a first management authorization response message to the management apparatus, wherein the first management authorization response message comprises at least: an authorization acknowledgment message and key information of the controlling terminal;
negotiating, between the management apparatus and the controlling terminal, a number, ID information and management authority of data acquisition terminals the controlling terminal is authorized to manage;
in response to that the management apparatus has authorized the controlling terminal to manage the data acquisition terminal, transmitting, by the management apparatus, a second management authorization request message to the data acquisition terminal corresponding to the controlling terminal, wherein the second management authorization request message comprises at least: information for inquiring whether to agree to accept management by the authorized controlling terminal, the ID information and the key information of the controlling terminal;

in case that the data acquisition terminal agrees to accept management by the authorized controlling terminal, feeding back, by the data acquisition terminal, a second management authorization response message to the management apparatus, wherein the second management authorization response message comprises at least: an authorization acknowledgment message; and negotiating, between the controlling terminal and the data acquisition terminal, a management authorization method and a management authority and feeding back a negotiation result to the management apparatus.

10. The method of claim 9, wherein the negotiating, between the controlling terminal and the data acquisition terminal, the management authorization method and the management authority comprises:

negotiating by the data acquisition terminal a session key with the controlling terminal according to the ID information and the key information of the controlling terminal;

negotiating the management authorization method and the management authority between the data acquisition terminal and the controlling terminal with the session key; and in case of a successful negotiation, connecting and managing, by the controlling terminal, the data acquisition terminal.

11. The method of claim 10, wherein in case of a failed negotiation, the data acquisition terminal returns to the S01 mode.

12. A management apparatus for a network of things, comprising:

a memory storing computer-readable instructions thereon; and one or more processors coupled with the memory, configured to execute the computer-readable instructions to perform operations comprising:

switching an operation mode of the network of things between:

a S01 mode in which the management apparatus directly connects and directly manages controlling terminals and data acquisition terminals for acquiring data resources in the network of things, and a S02 mode in which the management apparatus directly or indirectly connects the data acquisition terminals, directly connects and directly manages the controlling terminals and authorizes at least one of the controlling terminals such that the at least one of the controlling terminals directly connects and directly manages at least one of the data acquisition terminals; and in the S02 mode, grouping the data acquisition terminals by:

monitoring data utilization ratios of the controlling terminals with respect to the data acquisition terminals, in response to determining that a data utilization ratio of a controlling terminal with respect to a data acquisition terminal is above a second threshold, classifying the controlling terminal and the data acquisition terminal as a group, so that the data acquisition terminal is used as a data acquisition terminal the controlling terminal directly connects and directly controls, wherein the data utilization ratio of the controlling terminal with respect to said data acquisition terminal refers to a ratio of data obtained by the controlling terminal that is provided by the data acquisition terminal over all data obtained by the controlling terminal, and using the data acquisition terminal as a data acquisition terminal connected and directly managed by the controlling terminal, wherein the operations further comprise, in the S02 mode, obtaining and recording data acquired by each data acquisition terminal of the network of things and distributing at least a part of the obtained data to at least one controlling terminal of the network of things and recording data obtained by each of the at least one controlling terminal that is provided by each data acquisition terminal.

13. The management apparatus of claim 12, wherein the operations further comprise:

monitoring, by the management apparatus, numbers of the controlling terminals and the data acquisition terminals; and in response to determining that a sum of the numbers of the controlling terminals and the data acquisition terminals is above a first threshold, switching the operation mode of the network of things from the S01 mode to the S02 mode.

14. The management apparatus of claim 12, wherein the operations further comprise:

in the S02 mode, authorizing a controlling terminal to manage a data acquisition terminal by:

transmitting a first management authorization request message to the controlling terminal, wherein the first management authorization request message is used to inquire whether the controlling terminal agrees to join in management of a data acquisition terminal;

in case that the controlling terminal agrees to join in the management of the data acquisition terminal, receiving a first management authorization response message fed back by the controlling terminal to the management apparatus, wherein the first management authorization response message comprises at least: an authorization acknowledgment message and key information of the controlling terminal; and negotiating with the controlling terminal a number, ID information and management authority of data acquisition terminals the controlling terminal is authorized to manage.

15. The management apparatus of claim 14, wherein the operations further comprise:

in response to authorizing the controlling terminal to manage the data acquisition terminal, transmitting a second management authorization request message to the data acquisition terminal corresponding to the controlling terminal, wherein the second management authorization request message comprises at least: information for inquiring whether to agree to accept management by the authorized controlling terminal, the ID information and the key information of the controlling terminal;

in case that the data acquisition terminal agrees to accept management by the authorized controlling terminal, receiving a second management authorization response message fed back by the data acquisition terminal, wherein the second management authorization response message comprises at least: an authorization acknowledgment message; and receiving a negotiation result fed back from the controlling terminal, the negotiation result being obtained by negotiating a management authorization method and management authority between the controlling terminal and the data acquisition terminal.

16. The management apparatus of claim 12, wherein the operations further comprise:
    in the S02 mode, in response to a new data acquisition terminal accessing the network of things, selecting a corresponding controlling terminal for the new data acquisition terminal accessing the network of things, by:
    selecting a corresponding controlling terminal for the new data acquisition terminal according to ID information and location information of the new data acquisition terminal.

17. The management apparatus of claim 12, wherein the operations further comprise:
    in the S02 mode, sending a management authorization cancellation message to the data acquisition terminal and the corresponding controlling terminal to cancel management authorization between the data acquisition terminal and the corresponding controlling terminal.

18. A network of things system, comprising:
    data acquisition terminals and controlling terminals configured to acquire data resources; and
    the management apparatus of claim 12.

19. The network of things system of claim 18, wherein the operations further comprise:
    monitoring numbers of the controlling terminals and the data acquisition terminals; and
    in response to determining that a sum of the numbers of the controlling terminals and the data acquisition terminals is above a first threshold, switching an operation mode of the network of things from the S01 mode to the S02 mode.

20. The network of things system of claim 18, wherein the operations further comprise:
    authorizing a controlling terminal to manage a data acquisition terminal in the S02 mode by:
    transmitting a first management authorization request message to the controlling terminal, wherein the first management authorization request message is used to inquire whether the controlling terminal agrees to join in management of a data acquisition terminal;
    in case that the controlling terminal agrees to join in the management of the data acquisition terminal, receiving a first management authorization response message fed back by the controlling terminal to the management apparatus, wherein the first management authorization response message comprises at least: an authorization acknowledgment message and key information of the controlling terminal; and
    negotiating with the controlling terminal a number, ID information and management authority of data acquisition terminals the controlling terminal is authorized to manage.

* * * * *